Merrill & Maxwell,
Horseshoe.
Nº 43,623.   Patented July 19, 1864.
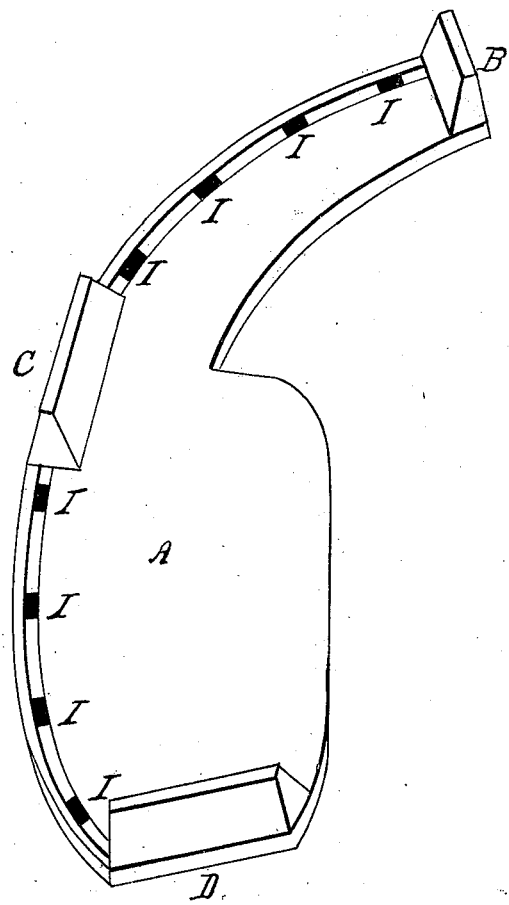
Witnesses.
Maturin Ballou Jr
A. W. Burton
Inventor.
Ira Merrill
Arthur Maxwell

UNITED STATES PATENT OFFICE.

IRA MERRILL AND ARTHUR MAXWELL, OF SHELBURNE, MASSACHUSETTS, ASSIGNORS TO ARTHUR MAXWELL, OF SAME PLACE.

IMPROVED OX-SHOE.

Specification forming part of Letters Patent No. 43,623, dated July 19, 1864.

*To all whom it may concern:*

Be it known that we, IRA MERRILL and ARTHUR MAXWELL, of Shelburne, in the county of Franklin and State of Massachusetts, have invented a new and improved method of making shoes of iron or other metals for shoeing oxen and other draft-animals that divide the hoof; and we do hereby declare that the following is a full and exact description thereof, reference being had to the accompanying drawings, and to the letters of reference marked thereon.

The nature of our invention consists in providing, in addition to the two corks, called "fore cork" and "hind cork," as now and heretofore used on each part of the shoe, a third cork or support so situated between the two corks as now and heretofore used that the whole hoof shall be equally and uniformly supported, which cannot be the case when only two corks are used; also thereby preventing either part of the hoof causing pain by turning or rolling outward, as is the case when only two corks are used, and also thereby assisting to secure the shoe more firmly to the hoof by preventing an unequal strain or pressure upon any part of the shoe.

Letter A represents an ox-shoe in the common form, with the fore cork marked B and hind cork marked D, and nail-holes marked $i\ i\ i\ i\ i$, as now and heretofore used.

The letter C represents the third and additional cork or support invented by us.

What we claim as our invention, and desire to secure by Letters Patent, is—

The insertion of the third cork, C, for the uses and purposes hereinbefore set forth.

IRA MERRILL.
ARTHUR MAXWELL.

Witnesses:
F. D. HICKS,
C. TAYLOR.